United States Patent
Gilbert et al.

(10) Patent No.: US 6,205,495 B1
(45) Date of Patent: Mar. 20, 2001

(54) WIRELESS INTERFACE FOR STANDARD MODEMS

(75) Inventors: Tim Gilbert, Vermillion; Frank Liebenow, Dakota Dunes, both of SD (US)

(73) Assignee: Gateway, Inc., N. Sioux City, SD (US)

(*) Notice: Subject to any disclaimer, the term of this patent is extended or adjusted under 35 U.S.C. 154(b) by 0 days.

(21) Appl. No.: 09/116,437

(22) Filed: Jul. 15, 1998

(51) Int. Cl.[7] .................................................. G06F 13/00
(52) U.S. Cl. .............................. 710/8; 710/14; 710/200; 455/42; 455/557
(58) Field of Search ........................ 710/1, 12, 8, 14, 710/20; 445/421, 556; 379/100; 455/1, 42, 557

(56) References Cited

U.S. PATENT DOCUMENTS

| | | | |
|---|---|---|---|
| 5,257,006 | | 10/1993 | Graham et al. .................. 340/310 A |
| 5,444,869 | | 8/1995 | Stricklin et al. ........................ 455/89 |
| 5,483,576 | | 1/1996 | Staples .................................... 379/58 |
| 5,519,763 | * | 5/1996 | Namekawa et al. ................. 455/556 |
| 5,594,952 | | 1/1997 | Virtuoso et al. ........................ 455/89 |
| 5,625,623 | | 4/1997 | Kent et al. ............................ 370/280 |
| 5,625,673 | | 4/1997 | Grewe et al. ........................... 379/61 |
| 5,628,055 | | 5/1997 | Stein ....................................... 455/89 |
| 5,761,259 | * | 6/1998 | Dingsor ................................ 375/285 |
| 5,905,719 | * | 5/1999 | Arnold et al. ........................ 370/330 |
| 5,915,021 | * | 6/1999 | Herlin et al. ........................... 380/21 |
| 5,937,348 | * | 8/1999 | Cina et al. ............................ 455/421 |
| 6,058,422 | * | 5/2000 | Ayanoglu et al. .................... 709/226 |
| 6,067,583 | * | 5/2000 | Gilbert ..................................... 710/8 |

* cited by examiner

Primary Examiner—Thomas Lee
Assistant Examiner—Tammara Peyton
(74) Attorney, Agent, or Firm—Suiter & Associates PC

(57) ABSTRACT

A wireless communications system for enabling an information handling system to wirelessly couple to a network is disclosed. A peripheral communications device for communicating information is sent to and by the information handling system via a wireless transmission medium. A base station couples to the peripheral communications device via the wireless transmission medium. The information handling system is enabled to communicate over a network via the network communications device. A method for communicating between an information handling system and a network via a wireless transmission medium is disclosed. Information to be transmitted is sent from the information handling system to a peripheral device, translated into a wireless data transmission format, transmitted via a wireless transmission medium to a remote device, converted into a network communications format, and sent to a modem connected to the network for transmission via the network.

50 Claims, 3 Drawing Sheets

WIRELESS INTERFACE FOR STANDARD MODEMS

FIELD OF THE INVENTION

The present invention generally relates to the field of information handling systems, and particularly to a wireless communications interface between an information handling system and a standard modem.

BACKGROUND OF THE INVENTION

Standard interfaces for information handling systems typically utilize a physical wire for transmission of information between the information handling system and a peripheral device such as a modem. As a result, standard, lower cost peripheral devices are typically designed to couple to the information handling system via a physical wire. However, physical wires are limited to a predetermined length. In applications where the user desires the information handling system to by moved, relocated or otherwise utilized beyond the reach of the wire, the length of the wire becomes a limiting factor.

In systems where computer system mobility is required, specialized peripheral devices may be utilized which allow wireless communication between the information handling system and a remote device. However, the specialized wireless communication devices are often too costly and specialized for the typical user where the high cost of the specialized wireless devices cannot be justified. Additionally, the specialized wireless devices contain redundant electronics and must replace existing standard devices that the user may already own. Thus, it would be highly desirable to provide a wireless communication system for communicating between an information handling system and a standard peripheral device without the need for specialized wireless communication devices.

SUMMARY OF THE INVENTION

The present invention is directed to a wireless communications system for enabling an information handling system to wirelessly couple to a network. In one embodiment the wireless communications system includes a peripheral communications device for communicating information sent to and by the information handling system via a wireless transmission medium, wherein the peripheral communications device includes a device interface for interfacing with a bus of the information handling system, a first wireless transmission interface for transmitting and receiving information via the wireless communications medium, and a first controller for managing the transfer of information between the device interface and the wireless transmission interface. The wireless communications system additionally includes a base station coupled to the peripheral communications device via the wireless transmission medium for coupling with a network communications device wherein the information handling system is enabled to communicate over a network via the network communications device, wherein the base station includes an I/O interface for interfacing with the network communications device, a second wireless transmission interface for transmitting and receiving information via the wireless communications medium, and a second controller for managing the transfer of information between the I/O interface and the wireless transmission interface.

The present invention is further directed to a method for communicating between an information handling system and a network via a wireless transmission medium. In one embodiment the method includes the steps of sending information to be transmitted from the information handling system to a peripheral device of the information handling system, translating the information to be transmitted into a wireless data transmission format, transmitting the wireless data transmission formatted information via a wireless transmission medium to a remote device, receiving the wireless data transmission formatted information with the remote device, converting the received information into a network communications format, and sending the network communications formatted information to a modem connected to the network for transmission of the network communications formatted information via the network.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
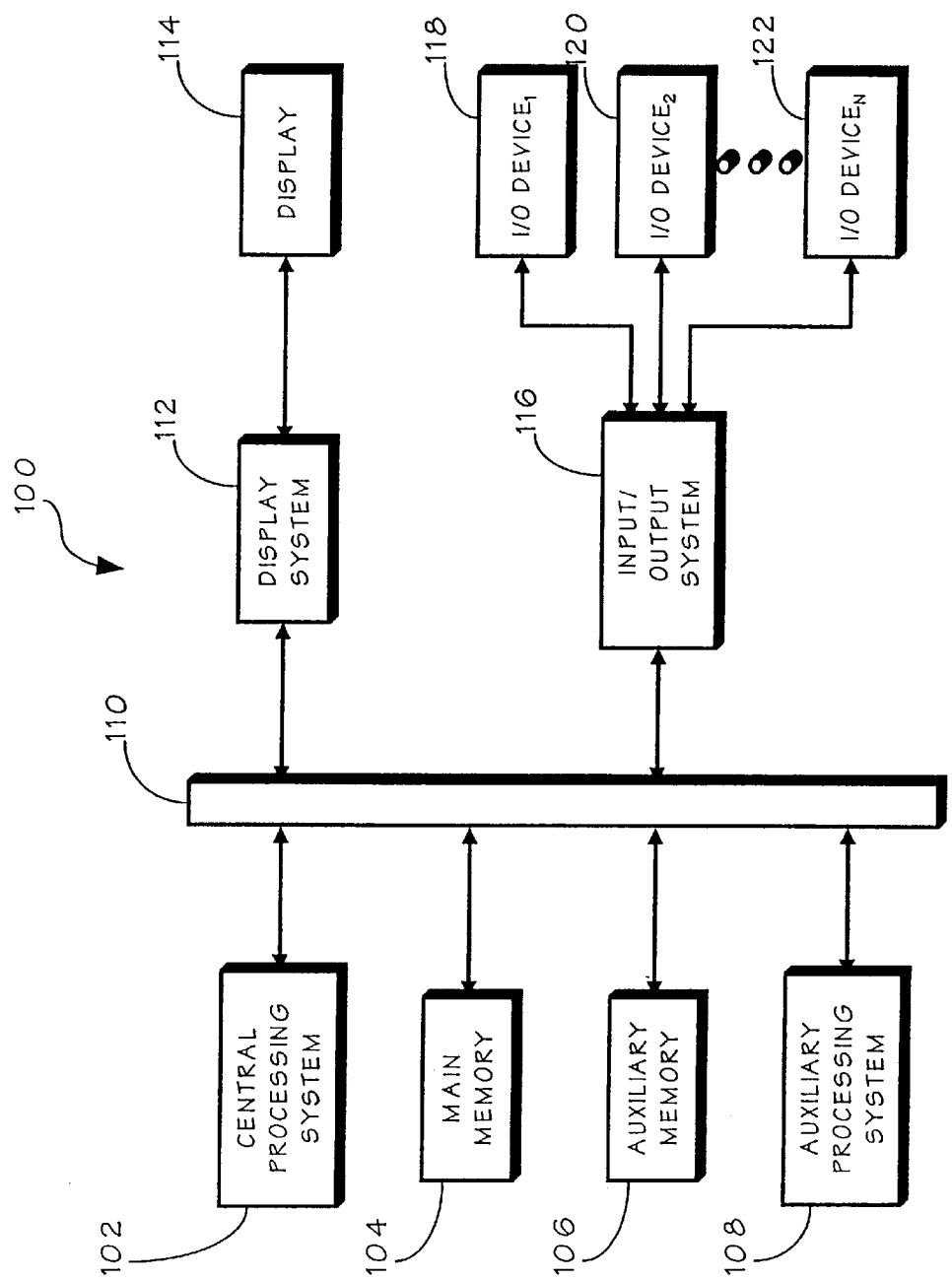
FIG. 1 is a block diagram of an information handling system operable to embody the present invention.

Referring now to FIG. 1, a hardware system in accordance with the present invention is shown. The hardware system shown in FIG. 1 is generally representative of the hardware architecture of an information handling system of the present invention. A central processing system 102 controls the hardware system of information handling system 100. Central processing system 102 includes a central processing unit such as a microprocessor or microcontroller for executing programs, performing data manipulations and controlling the tasks of hardware system of information handling system 100. Communication with central processor 102 is implemented through a system bus 110 for transferring information among the components of hardware system of information handling system 100. Bus 110 may include a data channel for facilitating information transfer between storage and other peripheral components of hardware system of information handling system 100. Bus 110 further provides the set of signals required for communication with central processing system 102 including a data bus, address bus, and control bus. Bus 110 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 100 may be compliant with any promulgated industry standard. For example, bus 100 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of hardware system 100 include main memory 104, auxiliary memory 106, and an auxiliary processing system 108 as required. Main memory 104 provides storage of instructions and data for programs executing on central processing system 102. Main memory 104 is typically semiconductor based memory such as dynamic random access memory (DRAM) and or static random access memory (SRAM). Auxiliary memory 106 provides storage of instructions and data that are loaded into the main memory 104 before execution. Auxiliary memory 106 may include semiconductor based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 106 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Hardware system 100 may optionally include an auxiliary processing system 108 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Hardware system 100 further includes a display system 112 for connecting to a display device 114, and an input/output (I/O) system 116 for connecting to one or more I/O devices 118, 120 up to N number of I/O devices 122. Display system 112 may comprise a video display adapter having all of the components for driving the display device, including video random access memory (VRAM), buffer, and graphics engine as desired. Display device 114 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 116 may comprise one or more controllers or adapters for providing interface functions between one or more of I/O devices 118–122. For example, input/output system 116 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, trackpad, trackstick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electroacoustic transducer, microphone, speaker, etc. Input/output system 116 and I/O devices 118–122 may provide or receive analog or digital signals for communication between hardware system 100 of the present invention and external devices, networks, or information sources. Input/output system 116 and I/O devices 118–122 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ADSL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of hardware system 100 of FIG. 1 by one having ordinary skill in the art would not depart from the scope or the spirit of the present invention.

Figure 2:
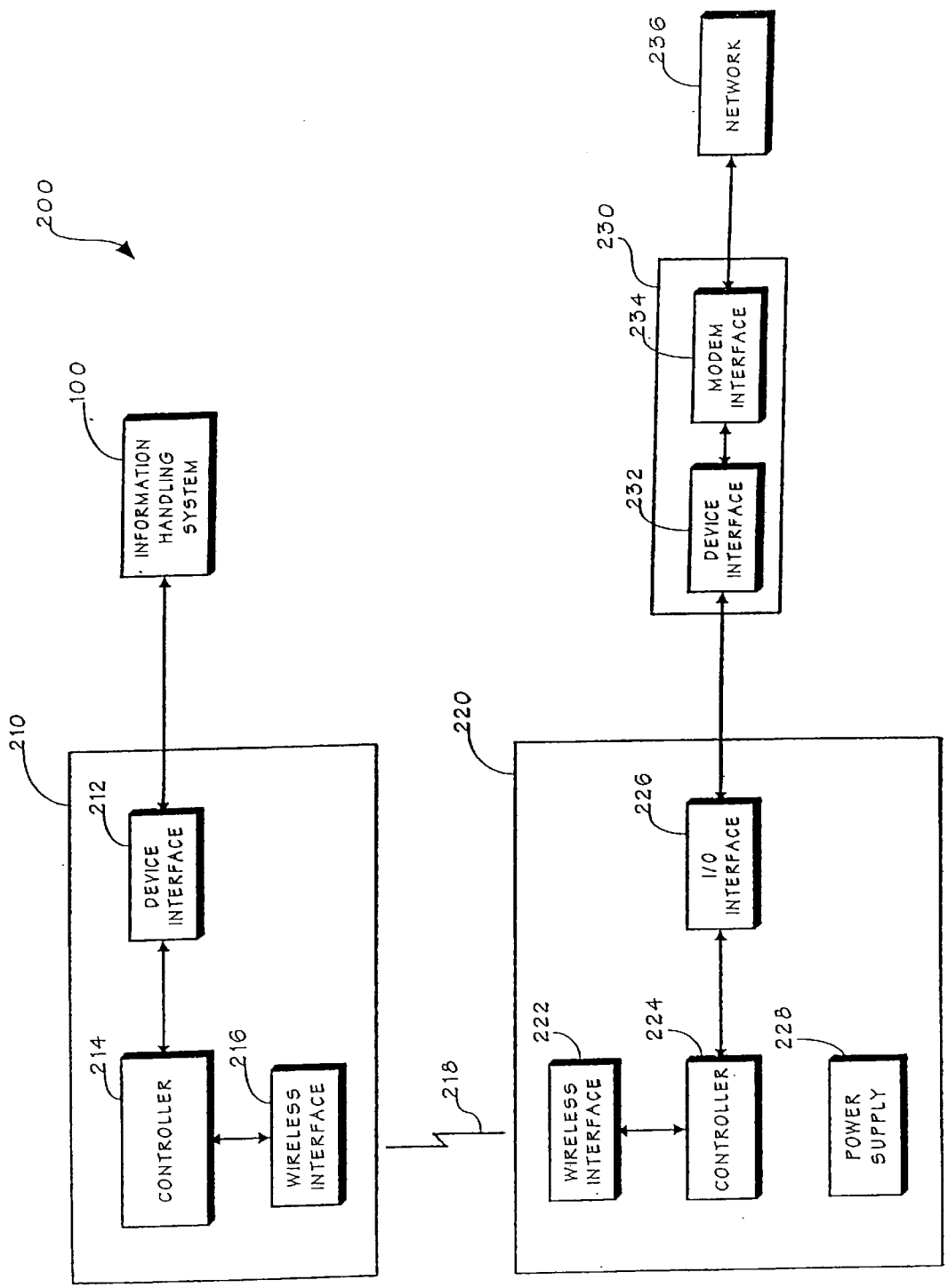
FIG. 2 is a block diagram of a wireless modem communications system in accordance with the present invention.

Referring now to FIG. 2, a wireless communications system of the present invention will be discussed. The wireless communications system 200 includes a peripheral communications device 210 operatively connected to a computer based information handling system 100. Peripheral communications device 210 is adapted for communicating information sent to and by information handling system 100 via a wireless transmission medium 218. Peripheral communications device 210 preferably includes a device interface 212 for interfacing with a bus 110 of information handling system 100 as shown, for example, in FIG. 1. Peripheral communication device 210 further includes a wireless transmission interface 216 for transmitting and receiving information via wireless communications medium 218, and a controller 216 for managing the transfer of information between device interface 212 and wireless transmission interface 218. Wireless interface 216 is capable of communicating via wireless transmission medium 218 with a remotely disposed base station device 220 having a wireless communications interface 216 similar to and compatible with wireless interface 222.

Base station 220 is adapted for coupling to peripheral communications device 210 via wireless transmission medium 218 for coupling with a network communications device 230 wherein information handling system 100 is enabled to communicate over network 236 via network communications device 230. Base station 220 preferably includes an I/O interface 226 for interfacing with network communications device 230, a wireless transmission interface 222 for transmitting and receiving information via wireless communications medium 218, and a controller 224 for managing the transfer of information between I/O interface 226 and wireless transmission interface 226. Base station 228 further includes a power supply 228 for supplying operating power to base station 220 and its internal components. Power supply 228 may include an ac-dc converter (not shown) for supplying power to base station 220 from an ac outlet, or may include a battery (not shown) for supplying power to base station 220 from the battery.

Wireless communications interfaces 216 and 222 may be any commonly available and known communications interface for commonly available and known wireless communications media 218. For example, communications interfaces 216 and 222 may be infrared transmission interfaces wherein wireless communications media 218 comprises an infrared spectrum. Preferably, wireless communications interfaces 216 and 222 are in compliance with a standard promulgated by the Infrared Data Association (IrDA). Alternatively, wireless communications interfaces 216 and 222 may be radio-frequency (RF) communications interfaces wherein wireless communications medium 218 comprises a radio-frequency spectrum.

Network communications device 230 preferably comprises a modem or similar type of device adapter for communicating over network 236. Network device 230 includes a device interface 232 for coupling with I/O interface 226 of base station 220, and a modem interface 234 for converting information received from base station 220 into a format compatible with network 236. In the case where network 236 is a telephone network utilizing a plain old telephone service (POTS) connection, for example, modem 230 may be a standard analog modem. Alternatively, in the case where network 236 is a cable network, modem 230 may be a cable modem. Preferably, modem 230, device interfaces 212 and 232, and I/O interface 226 are in compliance with a standard promulgated by the Personal Computer Memory Card International Association (PCMCIA) such as described with respect to FIG. 3.

Figure 3:
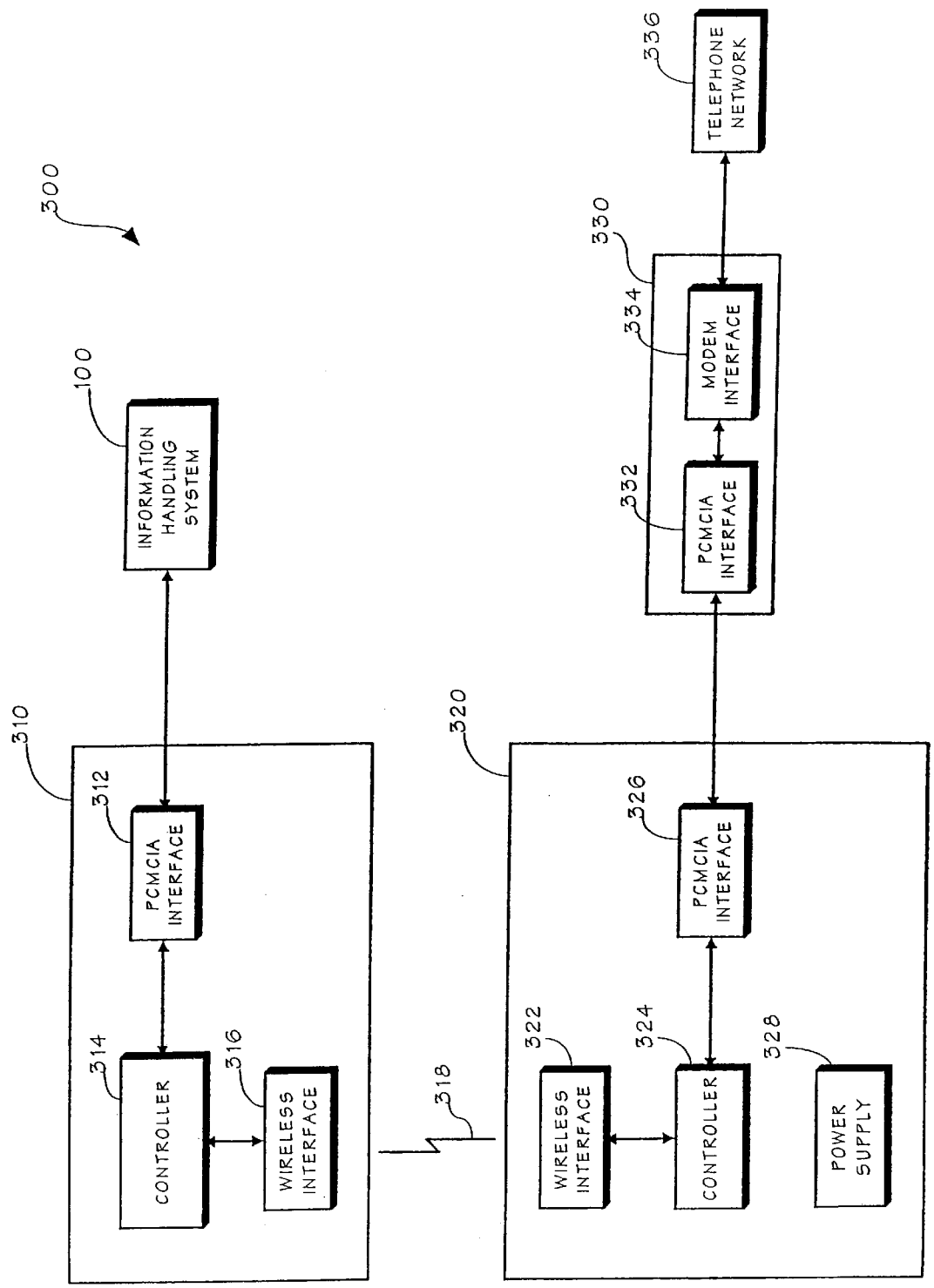
FIG. 3 is a block diagram of a wireless PCMCIA modem communications system in accordance with the present invention.

Referring now to FIG. 3, a wireless PCMCIA modem communications system of the present invention will be discussed. The wireless communications system 300 includes a peripheral communications device 310 operatively connected to a computer based information handling system 100. Peripheral communications device 310 is adapted for communicating information sent to and by information handling system 100 via a wireless transmission medium 318. Peripheral communications device 310 preferably includes a PCMCIA interface 312 for interfacing with a bus 110 of information handling system 100 as shown, for example, in FIG. 1. Peripheral communication device 310 further includes a wireless transmission interface 216 for transmitting and receiving information via wireless communications medium 318, and a controller 216 for managing the transfer of information between PCMCIA interface 312 and wireless transmission interface 318. Wireless interface 316 is capable of communicating via wireless transmission medium 318 with a remotely disposed base station device 320 having a wireless communications interface 316 similar to and compatible with wireless interface 322.

Base station 320 is adapted for coupling to peripheral communications device 310 via wireless transmission medium 318 for coupling with a network communications device 330 wherein information handling system 100 is enabled to communicate over network 336 via network communications device 330. Base station 320 preferably includes a PCMCIA interface 326 for interfacing with network communications device 330, a wireless transmission interface 322 for transmitting and receiving information via wireless communications medium 318, and a controller 324 for managing the transfer of information between PCMCIA interface 326 and wireless transmission interface 322. Base station 328 further includes a power supply 328 for supplying operating power to base station 320 and its internal components. Power supply 328 may include an ac-dc converter (not shown) for supplying power to base station 320 from an ac outlet, or may include a battery (not shown) for supplying power to base station 320 from the battery.

Wireless communications interfaces 316 and 322 may be any commonly available and known communications interface for commonly available and known wireless communications media 318. For example, communications interfaces 316 and 322 may be infrared transmission interfaces wherein wireless communications media 318 comprises an infrared spectrum. Preferably, wireless communications interfaces 316 and 322 are in compliance with a standard promulgated by the Infrared Data Association (IrDA). Alternatively, wireless communications interfaces 316 and 322 may be radio-frequency (RF) communications interfaces wherein wireless communications medium 318 comprises a radio-frequency spectrum.

Network communications device 330 preferably comprises a modem or similar type of device adapter for communicating over network 336. Network device 330 includes a PCMCIA interface 332 for coupling with PCMCIA interface 326 of base station 320, and a modem interface 334 for converting information received from base station 320 into a format compatible with network 336. In the case where network 336 is a telephone network utilizing a plain old telephone service (POTS) connection, for example, modem 330 may be a standard analog modem. Alternatively, in the case where network 336 is a cable network, modem 330 may be a cable modem. As shown in FIG. 3, modem 330, PCMCIA interfaces 312, 332, and 326 are in compliance with a standard promulgated by the Personal Computer Memory Card International Association (PCMCIA).

In operation of a preferred embodiment of the invention as shown in FIG. 3, information handling system 100 comprises a portable computer system or a desktop or tower type system wherein utilization of a physical wire for connection to telephone network 336 is impractical. Peripheral device 310 is a PCMCIA compliant personal computer card (PC card) installed in a PCMCIA slot of computer system 100. Base station 320 is remotely disposed near a physical connection to telephone network (e.g, near an RJ-11 phone jack), and power supply 328 is connected to an ac power outlet. Modem 330 is a PCMCIA compliant PC card installed in a PCMCIA slot of base station 320. Modem 330 is then plugged into telephone network 330. In such an arrangement, information handling system 100 may be utilized at any position with respect to base station 320 that is within the operating range of wireless communications medium 318 without being restricted in freedom and movement by a physical wire. Modem 330 functions as if it were directly installed in a PCMCIA slot of computer system 100.

In an alternative embodiment of the present invention, communications system 300 is adapted for communicating between peripheral device 310 and base station 320 by utilization of existing power lines (e.g., ac power lines). For example, wireless interface 316 may be adapted to couple with a power socket or outlet and communicate with wireless interface 322 also being coupled to a power socket or outlet on the same power circuit to which wireless interface 316 is coupled. In such an arrangement, the ac power lines function as transmission medium 318. In a further embodiment, transmission medium 318 may comprise a combination of wireless and ac power line transmission media. In such an arrangement, one or more peripheral devices 310 may couple to one or more base stations 320 via a combination of wireless and ac power line transmission media. A suitable method and apparatus for power line communications is described in U.S. Pat. No. 5,257,006. Said U.S. Pat. No. 5,257,006 is hereby incorporated by reference in its entirety.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 104 of one or more computer systems configured generally as described in FIG. 1. Until required by the computer system, the set of instructions may be stored in another computer readable memory such as auxiliary memory 106 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet that is interpreted or compiled after transmission to the computer system rather than prior to transmission. One skilled in the art would appreciate that the physical storage of the sets of instructions or applets physically changes the medium upon which it is stored electrically, magnetically, chemically, physically, optically or holographically so that the medium carries computer readable information.

It is believed that the wireless interface for standard modems of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A wireless communications system for enabling an information handling system to couple to a network, comprising:
   a peripheral communications device for communicating information sent to and by the information handling system via a wireless transmission medium, said peripheral communications device comprising:
      a device interface for interfacing with a bus of the information handling system,
      a first wireless transmission interface for transmitting and receiving information via the wireless communications medium, and
      a first controller for managing the transfer of information between said device interface and said wireless transmission interface; and
   a base station coupled to said peripheral communications device via the wireless transmission medium for coupling with a network communications device wherein the information handling system is enabled to communicate over a network via the network communications device, said base station comprising:
      an I/O interface for interfacing with the network communications device,
      a second wireless transmission interface for transmitting and receiving information via the wireless communications medium, and
      a second controller for managing the transfer of information between said I/O interface and said wireless transmission interface.

2. A wireless communications system as claimed in claim 1, wherein the wireless transmission medium comprises an infrared spectrum.

3. A wireless communications system as claimed in claim 1, wherein the wireless transmission medium comprises a radio frequency spectrum.

4. A wireless communications system as claimed in claim 1, wherein said peripheral device and said base station are adapted to communicate via power lines.

5. A wireless communications system as claimed in claim 1, wherein said device interface is in compliance with a PCMCIA standard.

6. A wireless communications system as claimed in claim 1, wherein said device interface is in compliance with a PCI standard.

7. A wireless communications system as claimed in claim 1, wherein said device interface is in compliance with a USB standard.

8. A wireless communications system as claimed in claim 1, wherein said device interface is in compliance with an ISA standard.

9. A wireless communications system as claimed in claim 1, wherein said device interface is in compliance with an EISA standard.

10. A wireless communications system as claimed in claim 1, wherein said device interface is in compliance with an MCA standard.

11. A wireless communications system as claimed in claim 1, wherein said device interface is in compliance with an IEEE standard.

12. A wireless communications system as claimed in claim 1, wherein said device interface is in compliance with a n ADB standard.

13. A wireless communications system as claimed in claim 1, wherein said device interface is in compliance with a SCSI standard.

14. A wireless communication system as claimed in claim 1, wherein said I/O interface is in compliance with a PCMCIA standard.

15. A wireless communication system as claimed in claim 1, wherein said I/O interface is in compliance with an RS-232 standard.

16. A wireless communication system as claimed in claim 1, wherein said I/O interface is in compliance with an IrDA standard.

17. A wireless communication system as claimed in claim 1, wherein said I/O interface is in compliance with an IEEE standard.

18. A wireless communication system as claimed in claim 1, wherein said I/O interface is in compliance with an internet standard.

19. A wireless communication system as claimed in claim 1, wherein the network communications device is a modem.

20. A wireless communications system for enabling an information handling system to couple to a network, comprising:
   communicating means for communicating information sent to and by the information handling system via a wireless transmission medium, said communicating means comprising:
      first interfacing means for interfacing with a bus of the information handling system,
      first wireless transmitting and receiving means for transmitting and receiving information via the wireless communications medium, and
      first managing means for managing the transfer of information between said interfacing means and said first wireless transmitting and receiving means; and
   coupling means coupled to said communicating means via the wireless transmission medium for coupling with a network communicating means for communicating over a network wherein the information handling system is enabled to communicate over a network via the network communicating means, said coupling means comprising:

second interfacing means for interfacing with the network communicating means, second wireless transmitting and receiving means for transmitting and receiving information via the wireless communications medium, and second managing means for managing the transfer of information between said second interfacing means and the wireless communications medium.

21. A wireless communications system as claimed in claim 20, wherein the wireless transmission medium comprises an infrared spectrum.

22. A wireless communications system as claimed in claim 20, wherein the wireless transmission medium comprises a radio frequency spectrum.

23. A wireless communications system as claimed in claim 20, wherein said peripheral device and said base station are adapted to communicate via power lines.

24. A wireless communications system as claimed in claim 20, wherein said first interfacing means is in compliance with a PCMCIA standard.

25. A wireless communications system as claimed in claim 20, wherein said first interfacing means is in compliance with a PCI standard.

26. A wireless communications system as claimed in claim 20, wherein said first interfacing means is in compliance with a USB standard.

27. A wireless communications system as claimed in claim 20, wherein said fist interfacing means is in compliance with an ISA standard.

28. A wireless communications system as claimed in claim 20, wherein said first interfacing means is in compliance with an EISA standard.

29. A wireless communications system as claimed in claim 20, wherein said first interfacing means is in compliance with an MCA standard.

30. A wireless communications system as claimed in claim 20, wherein said first interfacing means is in compliance with an IEEE standard.

31. A wireless communications system as claimed in claim 20, wherein said first interfacing means is in compliance with a ADB standard.

32. A wireless communications system as claimed in claim 20, wherein said first interfacing means is in compliance with a SCSI standard.

33. A wireless communication system as claimed in claim 20, wherein said second interfacing means is in compliance with a PCMCIA standard.

34. A wireless communication system as claimed in claim 20, wherein said second interfacing means is in compliance with an RS-232 standard.

35. A wireless communication system as claimed in claim 20, wherein said second interfacing means is in compliance with an IrDA standard.

36. A wireless communication system as claimed in claim 20, wherein said second interfacing means is in compliance with an IEEE standard.

37. A wireless communication system as claimed in claim 20, wherein said second interfacing means is in compliance with an internet standard.

38. A wireless communication system as claimed in claim 20, wherein the network communicating means is a modem.

39. A method for communicating between an information handling system and a network via a wireless transmission medium, comprising:

sending information to be transmitted from the information handling system to a peripheral device of the information handling system;

translating the information to be transmitted into a wireless data transmission format;

transmitting the wireless data transmission formatted information via a wireless transmission medium to a remote device;

receiving the wireless data transmission formatted information with the remote device;

converting the received information into a network communications format; and sending the network communications formatted information to a modem connected to the network for transmission of the network communications formatted information via the network.

40. A method as claimed in claim 39, wherein the wireless data transmission format is in compliance with an IrDA standard.

41. A method as claimed in claim 39, wherein the modem is in compliance with a PCMCIA standard.

42. A method as claimed in claim 39, further comprising the steps of:

receiving network formatted information from the network via the modem with the remote device;

converting the network formatted information into a wireless data transmission format;

transmitting the wireless data transmission formatted information via the wireless transmission medium to the peripheral device of the information handling system;

receiving the wireless data transmission formatted information with the peripheral device of the information handling system;

translating the wireless data transmission formatted information into a format readable by the information handling system; and sending the information to the information handling system.

43. A computer readable medium whose contents cause an information handling system to perform method steps for communicating between the information handling system and a network via a wireless transmission medium, the method steps comprising:

sending information to be transmitted from the information handling system to a peripheral device of the information handling system;

translating the information to be transmitted into a wireless data transmission format;

transmitting the wireless data transmission formatted information via a wireless transmission medium to a remote device;

receiving the wireless data transmission formatted information with the remote device;

converting the received information into a network communications format; and sending the network communications formatted information to a modem connected to the network for transmission of the network communications formatted information via the network.

44. A computer readable medium as claimed in claim 43, wherein the wireless data transmission format is in compliance with an IrDA standard.

45. A computer readable medium as claimed in claim 43, wherein the modem is in compliance with a PCMCIA standard.

46. A computer readable medium as claimed in claim 43, the method steps further comprising the steps of:
receiving network formatted information from the network via the modem with the remote device;
converting the network formatted information into a wireless data transmission format;
transmitting the wireless data transmission formatted information via the wireless transmission medium to the peripheral device of the information handling system;
receiving the wireless data transmission formatted information with the peripheral device of the information handling system;
translating the wireless data transmission formatted information into a format readable by the information handling system; and
sending the information to the information handling system.

47. A wireless communication system for enabling an information handling system to couple to a remote device, comprising:
a first transmission interface for transmitting and receiving information directly connected to the information handling device; and
a second transmission interface remotely located from the information handling system and coupled to the remote device capable of sending information to and receiving information from the first transmission interface such that the information handling system may communicate with the remote device, said second transmission interface being capable of physically coupling with a network communication device for coupling with a network such that the information handling system is capable of communicating over the network via the network communication device.

48. An information handling system for communicating with a remote device, comprising:
a processor for executing instructions executable by said processor;
a memory coupled to said processor for storing instructions executable by said processor; and
an interface coupled said processor for transmitting and receiving information to a second transmission interface remotely located from the information handling system and coupled to the remote device such that the information handling system may communicate with the remote device, said second transmission interface being capable of physically coupling with a network communication device for coupling with a network such that the information handling system is capable of communicating over the network via the network communication device.

49. An information handling system as claimed in claim 48, wherein said interface is controlled by a program of instructions stored in said memory.

50. An information handling system as claimed in claim 48, wherein said interface is controlled by a program of instructions transmitted to said memory from the remote device.

* * * * *